(12) United States Patent
Sirrine et al.

(10) Patent No.: US 6,729,186 B1
(45) Date of Patent: May 4, 2004

(54) MULTI-CHANNEL VIBRATION ANALYZER

(75) Inventors: Scott Anthony Sirrine, Kalamazoo, MI (US); Lon Charles Miller, Grand Junction, MI (US); Scott T. O'Neill, Battle Creek, MI (US); Frederick Earl James, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/085,374

(22) Filed: Feb. 28, 2002

(51) Int. Cl.⁷ .............................................. G01N 29/00
(52) U.S. Cl. .............................. 73/660; 73/593; 73/659
(58) Field of Search .......................... 73/660, 460, 650, 73/659, 570, 593; 324/160, 161, 162; 340/683; 701/71, 111

(56) References Cited

U.S. PATENT DOCUMENTS

| | | | |
|---|---|---|---|
| 4,426,641 A | 1/1984 | Kurihara et al. | 340/683 |
| 5,012,417 A | 4/1991 | Watanabe et al. | 701/71 |
| 5,051,751 A | 9/1991 | Gray | 73/660 |
| 5,187,434 A | 2/1993 | Ando | 324/207.25 |
| 5,365,787 A | 11/1994 | Hernandez et al. | 73/660 |
| 5,412,985 A | 5/1995 | Garcia et al. | 73/660 |
| 5,686,669 A * | 11/1997 | Hernandez et al. | 73/660 |
| 5,691,469 A * | 11/1997 | Mezger et al. | 73/117.3 |
| 5,893,042 A * | 4/1999 | Lohmann et al. | 701/111 |
| 5,955,674 A | 9/1999 | McGovern et al. | 73/650 |
| 6,116,105 A * | 9/2000 | Genise et al. | 74/335 |
| 6,128,959 A | 10/2000 | McGovern et al. | 73/660 |
| 6,388,444 B1 * | 5/2002 | Hahn et al. | 324/378 |
| 6,526,816 B2 * | 3/2003 | Genise et al. | 73/118.1 |

* cited by examiner

*Primary Examiner*—Hezron Williams
*Assistant Examiner*—Jacques Saint-Surin
(74) *Attorney, Agent, or Firm*—Rader, Fishman & Grauer PLLC

(57) ABSTRACT

A diagnostic vibration analyzing system and method for measuring and characterizing the torsional vibrations in a vehicle or a piece of industrial equipment (collectively a "vehicle"). An electronic control unit and sensor cooperate to measure speed fluctuations occurring between the passing of adjacent teeth of a rotating gear. These time measurements are the basis for displacement, velocity and acceleration calculations which, combined with driveshaft rotational order information, can be used to pinpoint the source of excessive driveline torsional vibrations. The use of multiple sensors can maximize per test the information available for analysis. The use of multiple sensors in a substantially simultaneous manner can isolate particular components in the tested vehicle.

28 Claims, 7 Drawing Sheets

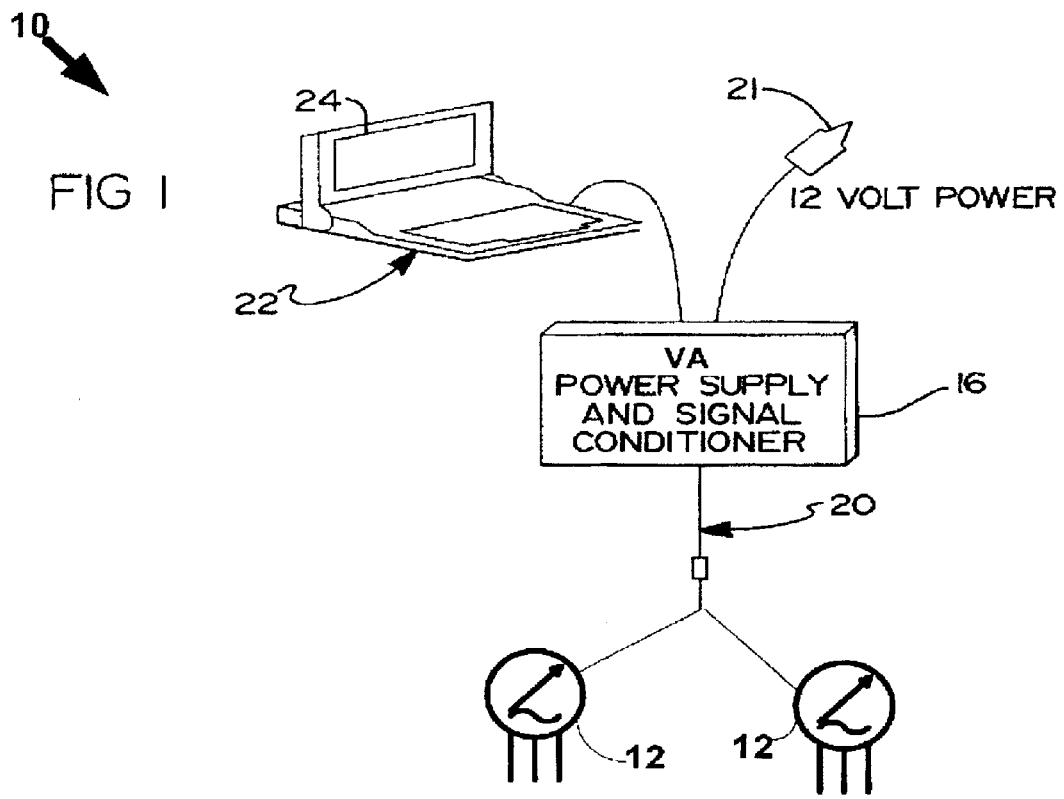
FIG 1
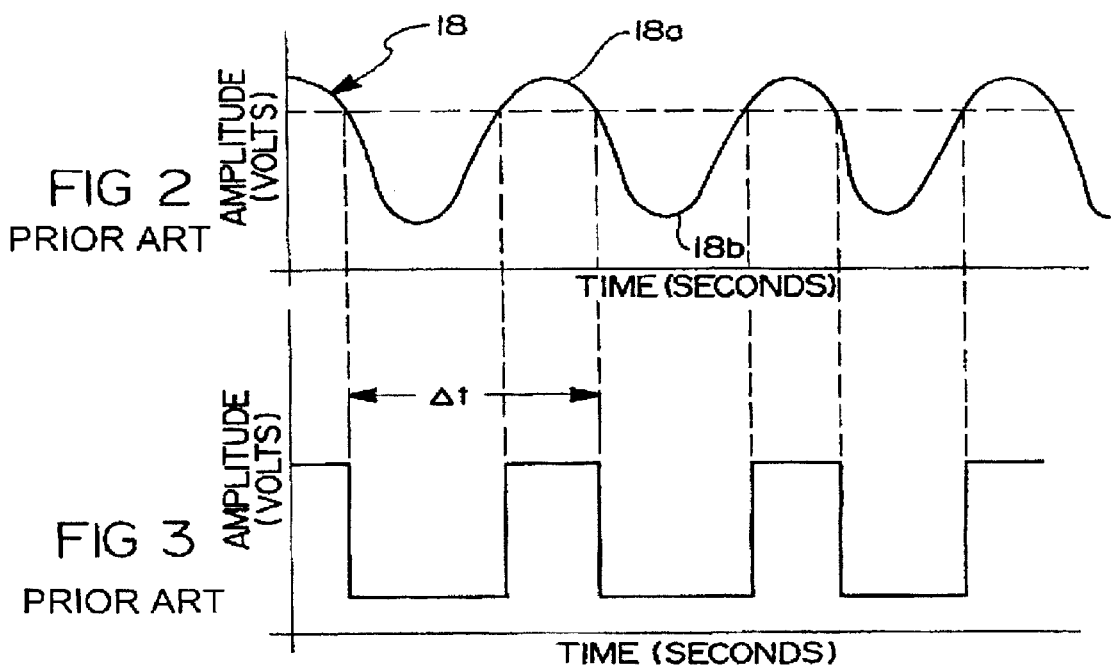
FIG 2 PRIOR ART
FIG 3 PRIOR ART

MULTI-CHANNEL VIBRATION ANALYZER

TECHNICAL FIELD

This invention relates generally to vehicle vibration diagnostics. In particular, the invention relates to a system and method for measuring and evaluating torsional vibration in a vehicle.

BACKGROUND OF THE INVENTION

Torsional vibration problems are a significant source of premature component failure and noise, in devices such as vehicles and industrial equipment (collectively "vehicles"). Instead of investigating the potentially ongoing root cause of a damaged component, damaged components are frequently replaced without any investigation of the underlying cause of the damage. Without addressing the root causes of the problem, the same problem often repeats itself, requiring the subsequent replacement of future damaged components. Such a practice can be very time consuming and expensive.

To combat the "trial and error" prior art approach, U.S. Pat. No. 6,128,959 (Patent '959) discloses a driveline vibration analyzer for measuring, analyzing, and characterizing the torsional vibrations in a vehicle driveline. The driveline vibration analyzer in Patent '959 discloses the use of a vibration analyzer with a single sensor and a single input channel.

There are instances when it would be desirable for a vibration analyzer to receive sensor measurements from multiple sensors and multiple input channels. The most important vehicle location from a vibration analysis perspective may vary from vehicle to vehicle, and from situation to situation. In varying vehicle environments, different locations in the vehicle will be of greater interest with respect to torsional vibration. Thus, it would be desirable for vibration analyzers to utilize multiple sensors at different locations in the vehicle to monitor multiple locations in the vehicle without the need to attempt to replicate test conditions or conduct duplicative tests.

The counter-timers used by Patent '959 typically utilize teeth flywheels that measure time in terms of the number of clicks, not the passage of time per se. Thus, the use of multiple sensor in a simultaneous or substantially simultaneous manner requires the integration of sensor measurements from sensor recording data at different rates and time intervals. It would be desirable for a multi-channel vibration analyzer to be able to read sensor measurements using sensor that operate at different rates and over different time intervals. It would also be desirable for a multi-channel vibration analyzer to be flexible in terms of sensor locations so that different components in the vehicle can be isolated and tested with respect to torsional vibration, without the unwanted complexity and likely errors associated with replicating test conditions or conducting duplicative tests.

Vibration analysis is subject to potentially many different variables that depend on the particular environment of the vehicle and the sensor used to evaluate vibration in the vehicle. It would be desirable for a multi-channel vibration analyzer to be flexible in the different types of environment-specific parameters that can be incorporated into the setup of the analyzer, the measurements sent to the analyzer, and the subsequent analysis of those measurements.

SUMMARY OF THE INVENTION

The multi-channel vibration analyzer ("vibration analyzer") of the present invention uses sensor at different locations in a vehicle to capture various sensor measurements. These sensor measurements can be used by the vibration analyzer to generate vibration characteristics useful in analyzing the torsional vibration at various locations in the vehicle. The vibration analyzer can incorporate different sensor measurements in a simultaneous or substantially simultaneous manner, even though the sensor may collect data at different rates and over different time intervals.

The vibration analyzer can incorporate three distinct subsystems to facilitate the flexibility of the vibration analyzer with respect to user requirements and particular vehicle environments. A setup subsystem can be used to select sensor locations. Sensor locations can be selected from a predefined list of useful sensor locations, or the user can use the setup subsystem to define new sensor locations and new combinations of sensor locations. The setup subsystem be used to define any vehicle-specific or environment-specific variables that should be incorporated into a vibration analysis. The vibration analyzer can also include an acquisition subsystem for capturing sensor measurements. Sensor measurements can be saved on a memory component of the vibration analyzer to allow the re-use of the same data for analysis purposes. An analysis subsystem can generate a vibration analysis from the sensor measurements captured by the acquisition subsystem and the setup attributes of the setup subsystem.

The system can provide a flexible means for incorporating sensor measurements from multiple sensor readings, and integrating those sensor readings with one or more setup attributes, to generate one or more vibration attributes useful in describing the vibration characteristics of the vehicle.

BRIEF DESCRIPTION OF THE DRAWINGS

The present invention will now be described, by way of example, with reference to the accompanying drawings, in which:

FIG. 1 is an example of a schematic view of a two-sensor embodiment of the system.

FIG. 2 is an example of a graphical representation of the signal produced by the magnetic speed sensor in some embodiments of the system.

FIG. 3 is an example of a graphical representation of the signal shown in FIG. 2 after the signal has been converted into a square waveform.

DETAILED DESCRIPTION OF SOME PREFERRED EMBODIMENTS

Figure 4:
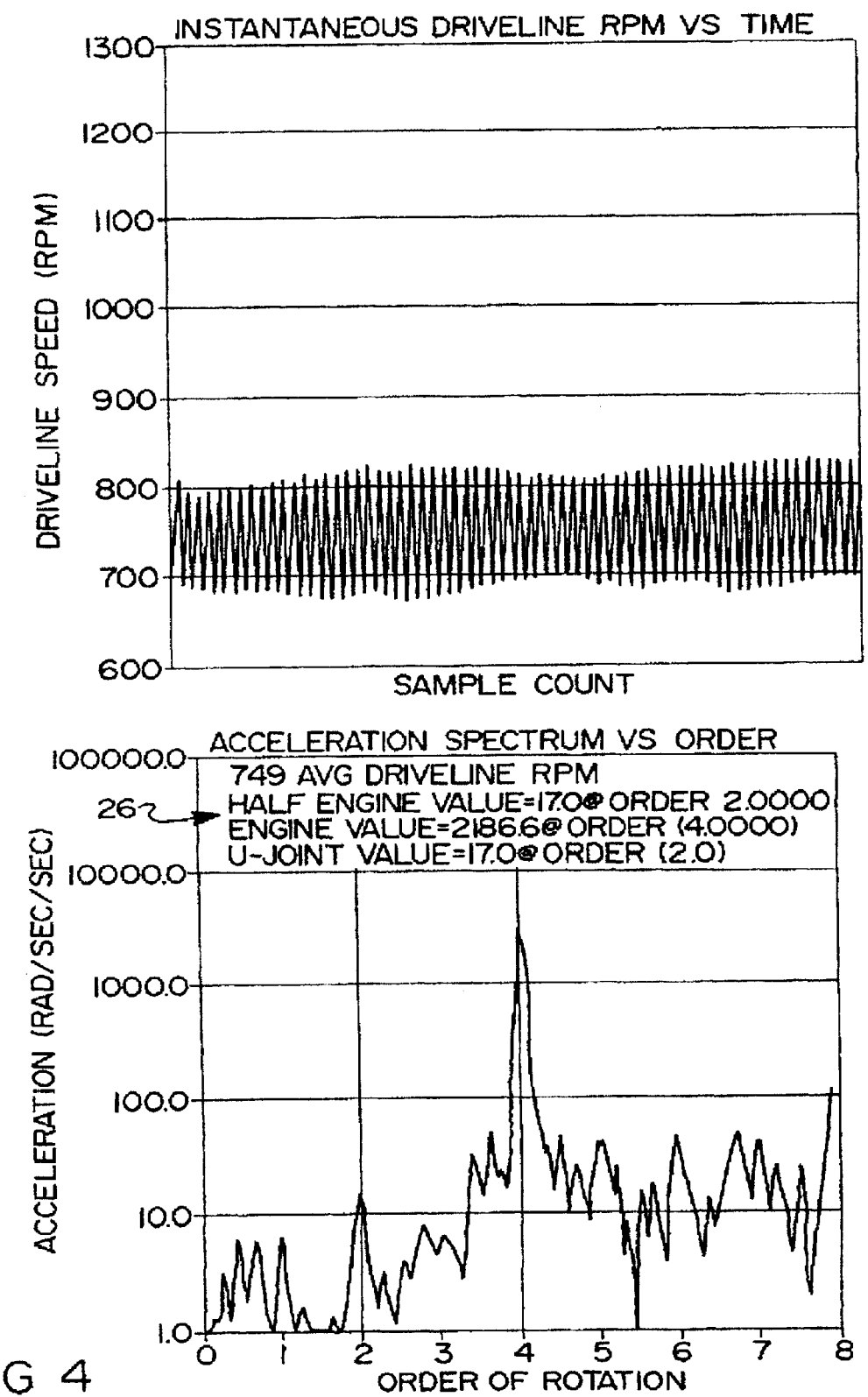
FIG. 4 is an example of a graphical representation of a plot produced by some embodiments of the vibration analyzer, illustrating measured driveline speed and acceleration for the driveline system being tested.

A multi-channel vibration analyzer system ("vibration analyzer system" or simply the "system") uses sensor at different vehicle locations to capture various sensor measurements. Sensor measurements can be used by the vibration analyzer to generate vibration characteristics useful in analyzing the torsional vibration at various locations in the vehicle. The vibration analyzer incorporates different sensor measurements in a simultaneous or substantially simultaneous manner, even though the sensor may collect data at different rates over different lengths of time.

In a preferred embodiment of the system, at least two sensor are used to quickly locate, identify, and analyze driveline and related vibrations. In a more preferred embodiment, the invention is designed specifically for in-vehicle use, and is designed to be easy to setup and operate. Vehicle-specific and environment-specific information can be inputted directly into the system. In a preferred embodiment, the system can import such information from a variety of other sources, such as the RoadRanger Driveline Angle Analyzer, a tool produced by Eaton Corporation, a company with offices in Southfield, Mich. The system can interface with other prior art tools in order to minimize the inputting of data by a user.

The system preferably includes pictorial-displays to aide a user in the setup of a test. Torsional vibration levels from static u-joints can be calculated by the system. In preferred embodiments, there is built-in support for all known makes and models of commercially available transmissions. Although the system can support more than two sensor located at virtually any location in a vehicle, some embodiments of the system support specific and predefined sensor location groupings. All data inputted to the system or generated by the system can be saved in a memory component of the system. The two or more sensor can collect data at different rates, and from different locations, in a simultaneous or substantially simultaneous manner. One sensor does not need to wait for another sensor to finish collecting data. The sensor can collect data at the same time. Similarly, the system can generate vibration attributes from these sensor measurements in a simultaneous or substantially simultaneous manner. The system does not need to delay in the creation of a vibration attribute from a sensor measurement due to the creation of another vibration attribute from a different sensor measurement. The ability to collect and analyze sensor measurements from multiple locations in this manner supports the ability of the system to isolate the vibration attributes of a particular component in the vehicle.

The system can be incorporated into a wide variety of different vehicles, such as cars, trucks, sport-utility-vehicles ("SUVs"), motorcycles, boats, airplanes, and other transportation devices. The system can also be incorporated into industrial equipment and machinery such as forklifts, and other devices subject to torsional vibrations.

I. Component-view of Vibration Analyzer

Turning now to the drawings, FIG. 1 illustrates one embodiment of a vibration analyzer system 10. The system 10 includes a series of sensor 12 for measuring the rotational speed of a particular driveline component. In the illustrated embodiment of the system 10, there are two sensor 12. In other embodiments, there could be as few as one sensor 12 or as many sensor 12 as can be found useful by the system 10. The primary difference between the vibration analyzer 10 illustrated in FIG. 1 and the vibration tool disclosed in U.S. Pat. No. 6,128,959 (Patent '959) is that the vibration analyzer 10 in FIG. 1 incorporates the sensor measurements of at least two sensor 12. In some embodiments of the system 10, the sensor is a magnetic speed sensor 12. In other embodiments, the sensor 12 is a non-contact magnetic sensor, such as a variable reluctance sensor, which provides speed or timing data in the form of a pulse train. Different embodiments of the system 20 can incorporate different combinations of different sensor 12. One type of sensor 12 is already present within most modern class 8 truck transmissions. Such a transmission can provide a vehicle speedometer signal, and can be easily reached from the rear of the transmission. In some preferred embodiments of the system 10, the portion of the driveline that interfaces with the engine, such as the output shaft, should also include a sensor 12. The system 10 can incorporate a wide variety of different sensor 12 types and locations.

The system 10 can incorporate different types filtering devices or conditioning units to enhance, modify, or "clean" sensor measurements. Such devices are not required by the system 10, but can be a preferred means for providing inputs to the system 10. In the illustration, an appropriate signal conditioning unit 16 is provided to filter and reduce noise in the signal output by sensor 12. In some embodiments, a single unit 16 may support two or more sensor 12. In other embodiments, each unit 16 can support a single sensor 12.

In some embodiments of the system 10, the signal conditioner 16 is connected to a power supply by a cigarette lighter 21 in the vehicle. In other embodiments, the signal conditioner 16 may include a battery or some other power source. The system 10 can utilize a wide variety of different power sources.

An electronic control unit ("ECU") 22 with a display unit 24 is the device responsible for receiving the sensor measurements from the sensor 12 located at the various locations in the vehicle, and generating relevant vibration attributes or characteristics from those sensor measurements. The ECU 22 may store the received sensor measurements in a memory component so that the sensor measurements can be used multiple-times, at the convenience of a user.

In many embodiments, a laptop computer will serve as both the ECU 22 and the display unit. Devices such as desktop computers, personal digital assistants, embedded computers, and other devices can also be used by the system 10. FIG. 1 discloses a wired environment of the system 10, however, wireless technologies can also be incorporated into the system 10 to facilitate greater flexibility in the types of devices that can serve as ECUs 22. In the disclosed exemplary wired embodiment, sensor 12 are electrically coupled via a lead 20 to the microprocessor-based electronic control unit (ECU) 22. In most embodiments, each sensor 12 will have its own lead 20. However, alternative embodiments may integrate the sensor measurement or otherwise compartmentalize a single lead 20 so that multiple sensors can share a single lead. If the particular embodiment of the system 10 incorporates one or more signal conditioning units 16, the leads 20 will connect the sensor 12 to the signal conditioning unit 16 and the signal conditioning unit 16 to the ECU 22. If the particular embodiment of the system 10 does not include signal conditioning units, then leads 20 will directly connect the sensor 12 to the ECU 22.

II. Sensor Measurements and System Calculations

The system 10 can flexibly incorporate a wide variety of different sensor 12 at various locations throughout the vehicle. However, such sensor 12 do not necessarily differ from the sensor used by single-sensor vibration analyzers, such as the prior art vibration analyzer disclosed in Patent '959. The differences between the multi-sensor vibration analyzer 10 and the single sensor vibration analyzer do not include an inherent different in the sensor 12. Thus, the various graphs disclosed in Patent '959 can be used to illustrate the functioning of a sensor 12 utilized by the multi-sensor system 10.

In most embodiments of the system 10, the sensor 12 will be toothed wheel sensors, which are described in greater detail below. The number of pulses per revolution can be set by a user of the system 10, as is also described in greater detail below. For the purposes of the example illustrated in FIG. 2, the sensor 12 provides a sinusoidal tachometer signal 18 based on clean sixteen pulses per revolution (one pulse for each tooth on a sixteen toothed wheel which rotates with the output shaft of transmission). A tachometer signal ("tach signal") is sensor measurement conveyed electronically, by change in voltage. FIG. 2 illustrates a tach signal in the form of a sinusoidal wave. FIG. 3 is the same tach signal in a square waveform.

In embodiments using toothed wheel sensors, sensor measurements are captured by the rotating of the toothed wheel in the sensor 12. Different embodiments and sensor locations can utilize different pulse per rotation ratios. Note that a signal peak 18a is created by a strong magnetic field occurring as a tooth passes near signal generating portion of the sensor 12, and a valley 18b is created when the signal generating portion of the sensor is positioned between passing teeth. In a preferred embodiment, the sensor 12 measures rotational speed or velocity, at the transmission output location of the vehicle. Although the transmission output location is typically not the point of highest torsional vibration in the driveline, it has been shown to be sufficiently torsionally active under both engine and universal joint excited vibration to accurately assess driveline torsional behavior. Other sensor locations can also be used, as described in greater detail below.

Alternately, however, any other suitable means could be provided for accurately measuring the rotational speed of a particular driveline component of interest. For instance, an alternate embodiment may include a similar magnetic sensor adapted to measure the rotational speed between passing teeth of a suitable test fixture affixed for test purposes to the particular driveline component of interest such as an input or output yoke of a vehicle transmission or drive axle. An optical sensor could also be used to indicate the passing of markings or indentations made on a particular rotating driveline component, or other component of the vehicle.

As described above, the ECU 22 is often a laptop computer implemented off-board the vehicle in a diagnostic field test application. However, with the requisite computer power and alternate design choices, the ECU 22 could alternately be implemented permanently on-board a vehicle as a separate processor or as part of a vehicle's engine or transmission controller. The ECU 22 can include a high-speed continuous period counter board for generating accurate time pulses of uniform frequency to be associated with the measurements obtained by sensor 12. The number of pulses can in effect counted between the sensed passage of each tooth. It can be appreciated that at very high rpms, this information is acquired quite rapidly.

The time measurement for each tooth is related to the instantaneous driveline angular velocity at the point of measurement. A gear with n teeth therefore enables n measurements of angular velocity per revolution of the gear. The following definitions apply to the present driveline vibration measurement system:

$\Delta t$=time measurement between consecutive gear teeth
N=number of data samples (preferably a power of 2)
$\Delta\theta = 2\pi/n$=is the angular displacement between any consecutive gear teeth
$d\theta/dt = \Delta\theta/\Delta t$=instantaneous driveline angular velocity
$k_j$ order value for spectral line j $$\frac{N*(\Delta\theta)}{\sum_{j=0}^{N-1}(\Delta t j)} = \omega = \text{average driveline angular velocity}$$

Conversion of the sensor output signal illustrated in FIG. 2 into a square waveform as shown graphically in FIG. 3 is one manner in which ECU 22 can perform quantization of the time passing between each pair of adjacent teeth. This "time between teeth" can be represented as $\Delta t$. In alternative embodiments, any other suitable method known to those having skill in the art for determining $\Delta t$ from signal 18 could also be used. Knowing that the angular displacement between two adjacent teeth is equal to $2\pi$ divided by the number of teeth, the angular velocity $d\theta/dt$ can be calculated readily.

Because the velocity measurements can be evenly spaced in terms of the gear rotation angle, application of a discrete Fourier transform to the angle domain velocity data results in a transformation of data into the order domain. This can be accomplished in any suitable method, in the presently preferred embodiment by a commonly available commercial FFT (fast Fourier transform) software package run on ECU 22. The Fourier transformation is particularly useful since it enables calculation of the torsional displacement and acceleration magnitudes in the driveline as a function of the harmonic order of rotation of the driveshaft.

Since the velocity measurements are evenly spaced in terms of $\Delta\theta$, application of a discrete Fourier transform to this angle domain data results in transformation into the order domain. Because the input data contains real values only, the double-sided FFT (positive as well as negative order) block has real and imaginary components which are equal. Disregarding the negative order data, the FFT function puts the real and imaginary components Rj and Ij into separate blocks having total of 1+N/2 elements with index j=0, 1, . . . , N/2. The relationship between the harmonic order K and the index j is thus:

$$K = j * \frac{(n/2)}{(N/2)} = j * \frac{n}{N}$$

$K_{max}$=n/2 maximum order
$\Delta K$=n/N=order resolution

Depending on the nature of the sensor 12 incorporated into the system 10, the system 10 can be configured to varying degrees of sensitivity. The system 10 can calculate all driveshaft vibration orders up to one-half of the number of gear teeth. Therefore, the system 10 is sensitive to u-joint excited torsionals, which are a constant order of two in all transmission gears. Engine excited vibration can be analyzed in all transmission gears up to a maximum gear ratio equal to one-half of the number of teeth divided by the engine crankshaft vibration order. For example, the fundamental engine firing order for a six cylinder 4-cycle engine is the third crankshaft order. Thus, with a sixteen tooth gear, the system 10 could thus analyze engine firing data in all gear ratios less than 2.67. Because engine excited torsionals are of greatest concern in the high range transmission gears, a sixteen tooth gear or wheel is thus adequate. In addition, the order resolution can be improved by increasing the size of the sample. For example, using the same gear and a sample size of 256, the system 10 will record 16 shaft rotations and can resolve torsional vibration to the nearest $1/16$ order.

At each rotational order of the crankshaft, ECU 22 produces velocity magnitude data. From this velocity data, displacement and acceleration can also be calculated in a manner well known to those having skill in the art. After the real ($a_k$) and imaginary ($b_k$) components are normalized, the magnitude of the velocity spectrum is calculated for each Kth order component from:

$$A_K = (a_k^2 + b_k^2)^{1/2}$$

From the above angular velocity magnitude spectrum, the torsional displacement and acceleration magnitudes in the driveline are calculated as a function of the harmonic order of rotation. This is derived as follows:

$$(d\theta/dt)_K = A_K * \cos(\omega_K * t)$$

$$\theta_K = (A_K/\omega_K) * \sin(\omega_K * t)$$

$$(d^2\theta/dt^2) = -A_K * \omega_K * \sin(\omega_K * t)$$

By substituting $\omega_K = \omega * K$ into the equations for the maximum (magnitude displacement, velocity and acceleration:

$$(\theta)_{max} = A_K / (\omega * K)$$

$$(d\theta/dt)_{max} = A_K$$

$$(d^2\theta/dt^2)_{max} = -A_K * \omega * K$$

Details of these calculations are, however, provided in SAE paper No. 942324 entitled "DVA-A New Tool for the Trucking Industry", McGovern et al, presented on Nov. 8, 1994, incorporated herein by reference. These values are preferably formatted and plotted on a suitable display device 24 coupled to, or part of, ECU 22.

Figure 5:
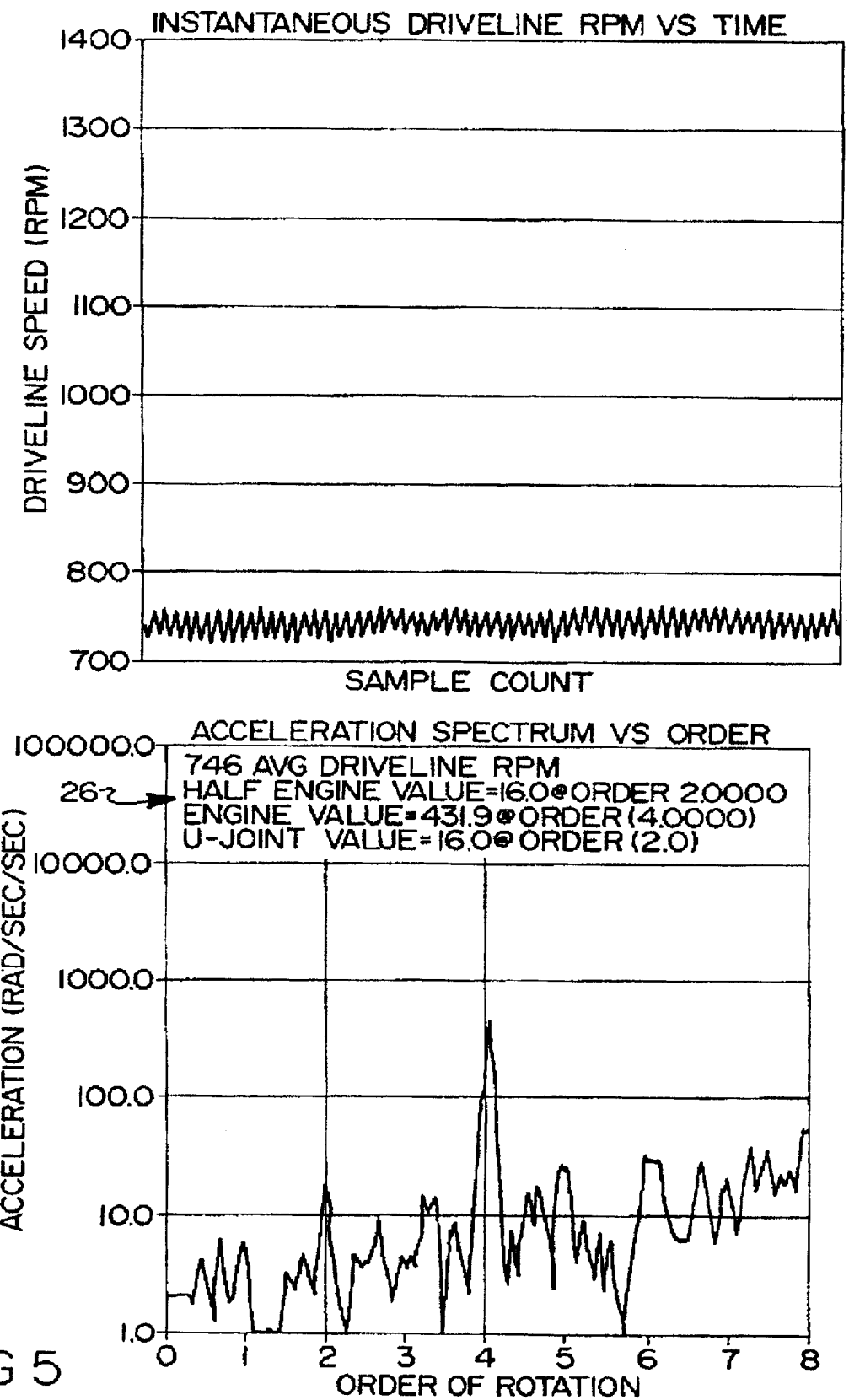
FIG. 5 is an example of a graphical representation of the same driveline as in FIG. 4, after a soft clutch was installed to remedy excessive torsional vibration.

One way to present information to the user of the system 10 is in the manner illustrated in the graphs of FIGS. 4 and 5. As shown therein, driveline speed (in rpm) vs. sample count is plotted over time in the top graph of FIGS. 4 and 5. One of ordinary skill in the art will readily appreciate that a driveline rotating at a perfectly constant rotation free from torsional vibration would produce a straight horizontal line in this graph. Calculated acceleration and displacement (in terms of the deviation from a straight horizontal line) are plotted relative to driveshaft rotational order in the lower graphs of FIGS. 4 and 5. Preferably, orders of particular interest, and the magnitude of acceleration for those orders are also indicated by the system 10 numerically at 26. In addition, numerous additional displays of graphical and/or numerical information can also be provided to the system 10 user at 26.

Driveline torsional vibration can be primarily induced from two primary sources: engine torsionals occurring at the fundamental engine firing frequency and its harmonics, and universal joints operating with non-zero working angles. Alternative embodiments may incorporate different sources, utilizing a greater number of sources, or using fewer sources. The drivetrain system responds to this torsional excitation by dynamically winding and unwinding. A certain amount of this torsional activity is generally always present and typically represents no danger to driveline components. However, if the excitation frequency is coincident with a driveline torsional resonant frequency, serious amplification of driveline torsionals can occur.

The driveline consists of numerous components which can be dynamically modeled as a discrete system containing spring and mass elements. In theory, the driveline will produce one resonant frequency for every degree of freedom in the mode. However, only the second torsional mode is considered herein since it is the only driveline resonant mode which is in the frequency range such that it is regularly excited by forced inputs from the engine and universal joints.

The second torsional mode can be described as the transmission and axle rotating components torsionally sprung in phase on the clutch and shaft springs, with nodes at the flywheel and wheels. Although the front drive axle is typically the system anti-node, high torsional displacements can be consistently measured during resonance at the transmission output.

Data obtained at each rotational order of the driveshaft can be compared by ECU 22 to predetermined thresholds, above which torsional vibrations are deemed to be excessive. Measured vibrations above the preset threshold can be indicated visually to the system 10 operator through flashing or colored display 24. The acceptable vibration threshold levels can be calculated or determined empirically and most likely will differ with combinations of driveline components.

Although various calculations can be made from the basic rotational speed measurements obtained, only those pertaining to the second torsional mode is preferably considered in many embodiments of the system 10 since it is the only driveline resonant mode which is in the frequency range such that it is regularly excited by forced inputs from the engine and universal joints. However, the system 10 is capable of evaluating higher and lower driveline torsional modes within the basic response limitations defined by the maximum vibration order and order resolution as discussed above. Second torsional mode typically ranges in frequency from 20–100 Hz, but most commonly occurs between 30–70 Hz in the high range transmission gears. The second mode increases in frequency as the transmission numerical gear ratio increases, resulting in the lowest resonant frequency in top gear. The resonant vibration amplitude is the highest in top gear and progressively decreases in amplitude for the lower gears.

The internal combustion engine is the most dominant torsional exciter in the driveline. The combustion process produces a dynamic torque waveform which creates oscillatory driveline dynamic torque and torsional displacements. The engine dynamic torque waveform is comprised mostly of the fundamental engine firing frequency, but there is also a measurable torque component at the 0.5, 1.5 and 2.0 harmonics of the engine firing frequency. For a typical four-cycle six-cylinder engine, firing occurs three times per crankshaft revolution (3rd order). The 0.5, 1.5 and 2.0 harmonics would therefore represent the 1.5, 4.5 and 6.0 crankshaft orders, respectively.

The 4.5 and 6.0 crankshaft orders usually do not present a problem because they are too high in frequency to excite the driveline second torsional mode. However, if the third crankshaft order is coincident in frequency with the second torsional mode, significant resonant amplification can occur and therefore the third order is of particular interest. Similarly, the 1.5 crankshaft order excitation is also a concern because it will be coincident with the resonant frequency at some speed in the primary engine operating range. In some cases, the 1.5 crankshaft order excitation is of sufficient amplitude to create damaging cyclical loading and, therefore is also of interest.

Torsional effects of non-zero working angles in universal joints will include an oscillatory output rotational speed given a constant input velocity, varying at the rate of two cycles per shaft revolution. Therefore, second order accelerations are also of interest. Significant torsional accelerations in the second order are therefore indicative of non-zero U-joint working angles.

A universal joint offset by some working angle will produce torsional acceleration in the output yoke approximately equal to the joint angle squared, multiplied by the input yoke velocity squared. The torsional effect can be canceled by mounting the downstream u-join in phase and with the same operating angle. The m u-joints in series (and in phase), the approximate kinematic equation for the resultant output torsional acceleration is given by:

$$(d^2\theta/dt) = \omega^{-2} * (\alpha_1^2 - \alpha_2^2 + \alpha_3^2 - \ldots + \alpha_m^2)$$

where $\omega$=input shaft rotational speed (in radians/second) and $\alpha$=joint working angle (in radians). The highest torsional acceleration will be obtained in top gear at the highest driveshaft speeds.

The drivetrain can respond to such torsional excitations by dynamically winding and unwinding. A certain amount of this torsional activity is generally always present and represents no danger to driveline components. However, if the excitation frequency is coincident with a driveline torsional resonant frequency, serious amplification of driveline torsionals can occur. Excessive universal joint torsionals can cause steady state vibration problems as well as resonant excitation. The steady state problems typically occur at highway cruise speeds and cause excessive driveshaft and component torsional accelerations. If the joint torsionals are sufficient to excite the second torsional mode at the resonant speed, even higher torsional displacements can develop.

Figure 6:
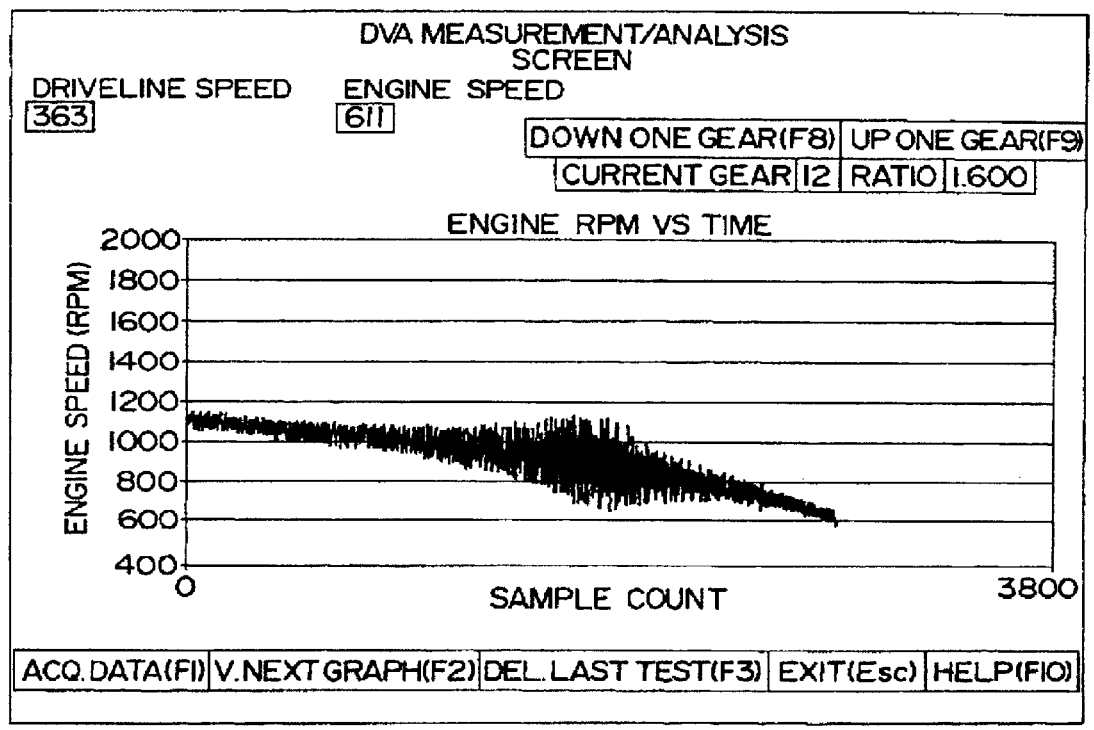
FIG. 6 is an example of a graph generated by some embodiments of the system, indicating driveline vibration magnitudes in real time.

In order to use the system 10, a user, operator or test technician (collectively "user") preferably connects lead 20 to sensor 12. The processing of a setup system and other related processing is described in greater detail below. The vehicle can be driven and data logged and stored in a memory device for later use or processed in real time. Preferably, a graph such as that shown in FIG. 6 is provided on display 24 in order to indicate in real time to the user at what speed and in which gears torsional vibrations are most prevalent. This real time speed display preferably has sufficient response to indicate torsional activity in real time. FIG. 6 illustrates the real time display screen for a driveline experiencing engine firing excitation of the second driveline torsional mode. Using this screen, the user of the system 10 can quickly cycle through each transmission gear under varying operating conditions and loads in search of excessive torsionals (indicated by speed variations which exceed a certain limit). If excessive torsional activity is encountered, the user can immediately acquire data for further processing. This saves a great deal of time and eliminates the need to obtain large amounts of data at all speeds and gears.

Driveline torsional activity can be treated in several ways including reducing the amplitude of the excitation source, shifting the resonant speed below the engine's operating range or providing sufficient driveline damping to attenuate torsional response. The preferred treatment is dependent upon the nature of the problem. By using the system 10 to identify the source of vibration, the appropriate remedy can be selected. Referring back to FIGS. 4 and 5, FIG. 4 illustrates measurements taken from a driveline exhibiting significant fourth order vibration. FIG. 5 illustrates measurements from the same driveline after appropriate dampening was achieved, with a significant decrease in fourth order vibration. Additional detail concerning this example are provided in the incorporated SAE paper. To increase accuracy, it may also be preferable to average data (as long, as rotational speed remains constant) as well as to add data from the 115/16 order and 21/16 order with the 2.0 order data. The same may also be applied to information obtained at the other orders of interest as well.

The system 10 thus provides a convenient and simple solution to many vehicle vibration problems. Sources of vibrations can be pinpointed thereby in order to eliminate expensive and inefficient trial and error driveline repair methods. The system 10 is configured to allow a vehicle to be tested and the results analyzed in real-time, thereby minimizing vehicle downtime. Additionally, the system 10 can also be used as an engineering tool to study torsional vibration in vehicle drivelines for use in driveline design as well as input to engine and transmission control algorithms.

III. Subsystem View

Many embodiments of the system 10 can be viewed in terms of three subsystems, a setup subsystem 50, an acquisition subsystem 52, and an analysis subsystem 54. Alternative embodiments may incorporate fewer than three subsystems, or four or more subsystems.

Figure 7:
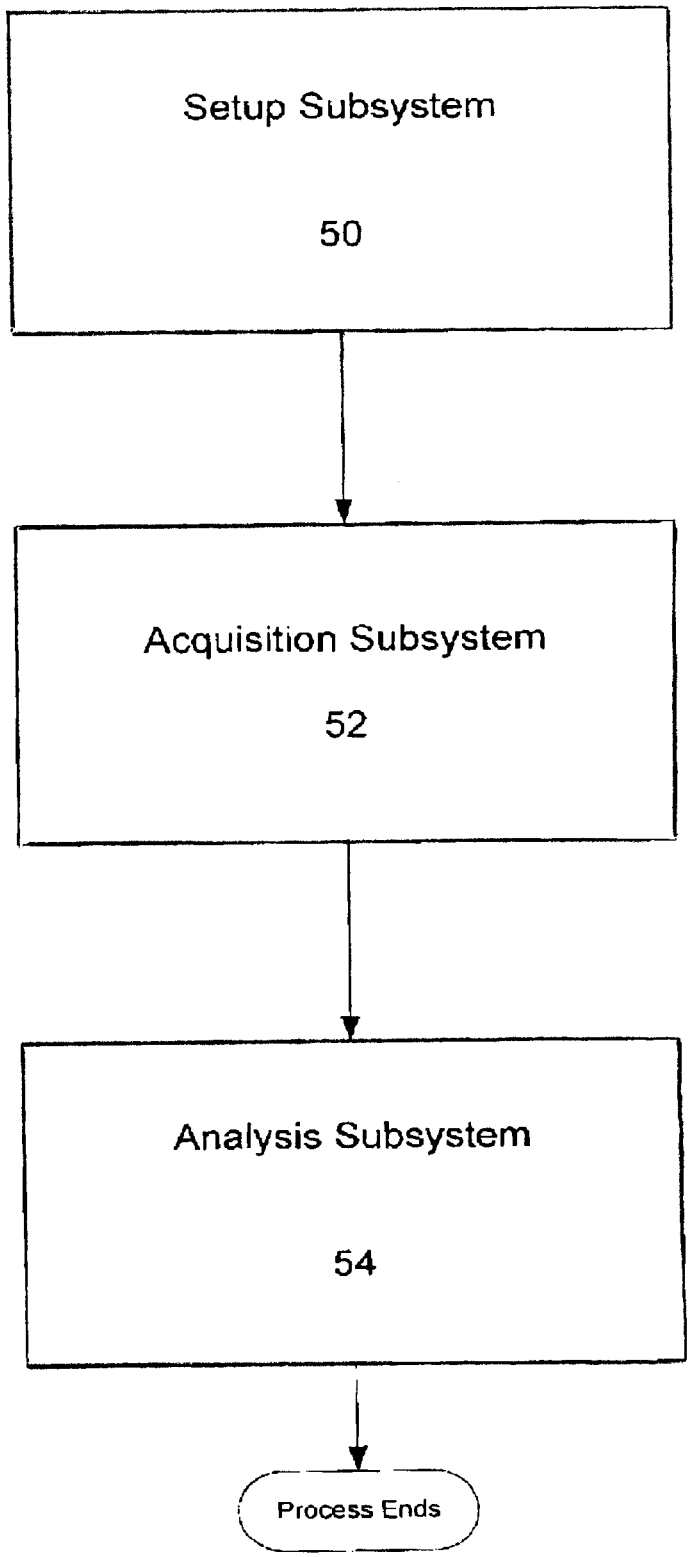
FIG. 7 is high-level flowchart illustrating some of the subsystems that are used in some of the embodiments of the vibration analyzer.

FIG. 7 is a high level flowchart illustrating that the processing begins with the setup subsystem 50, which involves configuring the system 10 for testing, and setting up the various sensor 12. Then processing moves to the acquisition subsystem 52, which involves acquiring sensor measurements from the sensor 12, as those sensor 12 have been configured by the setup subsystem 50. After the sensor measurements have been captured, the analysis subsystem 54 can then perform the analysis to create one or more useful vibration attributes or characteristics relating to the vehicle.

A. The Setup Process

Figure 8:
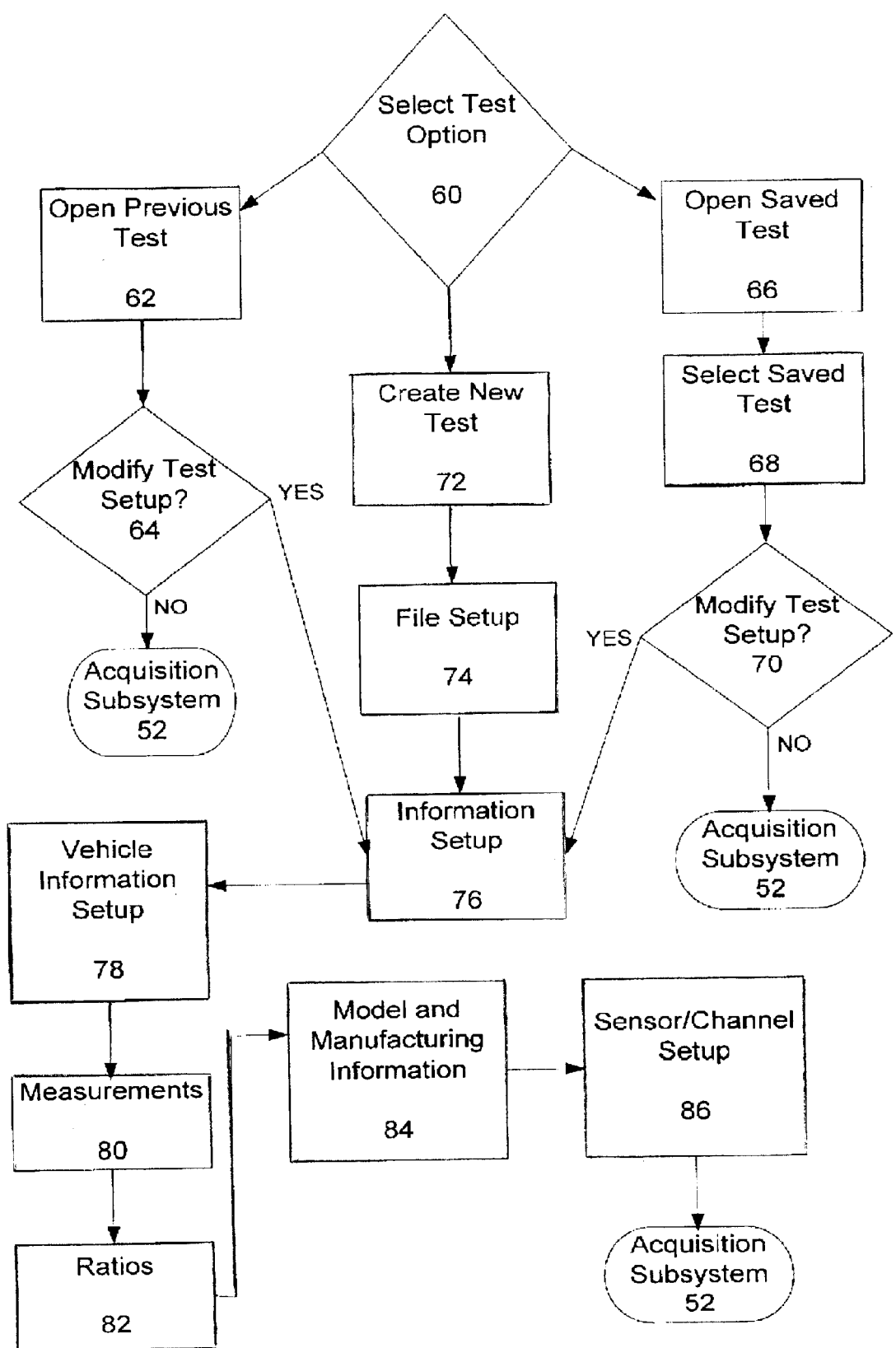
FIG. 8 is a flowchart illustrating some of the processing performed by some embodiments of the setup subsystem.

FIG. 8 is a flowchart that can illustrate one embodiment of a setup subsystem 50. The first option that a user can be given is a starting point for testing at 60. The user can either open the most recent previous test at 62, open a saved test at 66, or create a new test at 72.

If the user chooses to open the (most recent) previous test at 62, the user is then given the option of modifying that test setup at 64. If no changes are desired at 64, then the system 10 can proceed to the acquisition subsystem 52. If changes are desired at 64, then the system proceeds to the information setup process at 76. This process preferably uses the same screens as the create new test process, which is described in greater detail below, except that the previous test information will already be entered on the relevant screens. By allowing a user to use the last test as a starting point, the system 10 facilitates ease of use and a quick ramp up time.

If the user chooses to open a saved test at 66, that user must select the saved test at 68. Many preferred embodiments of the system 10 provide as much flexibility as possible in setting up meaning file names and data folder hierarchies to facilitate the effective storage and retrieval of test profiles. The ability to save and reuse test profiles saves time for users of the system 10. Even if a different test profile is desired, the opportunity to make changes to the profile is presented at 70. If no changes are desired, the system 10 proceeds to the acquisition subsystem 52. If changes are desired, the system 10 proceeds to information setup at 76, a step described in greater detail below. The process then follows the process for creating new test profiles, except that data fields will already possess data. The user may only desire to change one data field, and leave the rest as they were previously. The user could also decide to change each and every data field from the saved test profile.

If the user decides to create a new test profile at 72, the file for storing that profile is created at 74. As described above, file names are not restricted in length. However, the operating system of the ECU 22 will limit the length of the file name, and may restrict the ability to incorporate particular characters or symbols into the file name. It is recommended that a name be chosen that effectively identifies the data for future use. Some embodiments will utilize predefined formats for filenames.

The next step in the process is the input of one or more setup attributes or characteristics. In many preferred embodiments of the system 10, vehicle information, driveline measurements, transmission ratios, make/model information, sensor locations, sensor types, and other types of information are setup attributes which are defined before data acquisition begins. The process of inputting setup attributes preferably begins with an information setup screen at 76. In many embodiments, the steps that follow the information setup screen at 76 need not be performed in any particular order. Rather, each step preferably represents a "tab" on the information setup screen that can be filled in by the user in a wide variety of different orders, consistent with graphical user interface standards and goals regarding the flow of software applications. For illustration purposes only, the functionality steps from 78 through 86 are disclosed in a linear progression.

Vehicle information setup occurs at 78. Vehicle setup fields can include but are not limited to, unit number, fleet name, fleet account number, manufacturer, vehicle type (e.g. truck, car, etc), model, vehicle identification number, transmission model number, transmission serial number, clutch manufacturer, clutch size, the number of clutch springs, clutch part number, engine make/model, wheel base, steer axle tire size, drive axle tire size, main driveline series, axle manufacturer, drive axle serial number, vehicle mileage, vehicle build data, and a user identification field. Different embodiments may use fewer vehicle setup fields, or a greater number of vehicle setup fields. Different fields may be incorporated than those attributes listed above. If the analysis subsystem 52 is to perform inertial calculations, information relating to the main driveline series and axle manufacturer should be required to be entered by the user.

The next step can be the inputting of driveline measurement attributes at 80. The driveline measurements screen or tab can be filled out to record the measurements of the frame, transmission, driveshaft, drive axle angles, and other types of information. These attributes may be useful in determining the cause of driveline vibrations, although an initial check of the driveline angle analyzer should have already been done to eliminate angles as the cause of the vibration. Information already captured by a driveline angle analyzer can be downloaded directly into this screen by using a file import function. The driveline measurement attributes can include but are not limited to, frame angles, transmission angles, drive axle angles, shaft angles, phase angles, length, front airbag height, read air bag height, maximum engine RPM in top gear, top gear ratio, drive inertia, coast inertia, transmission to axle (rad/sec$^2$), and any other characteristics or attributes.

Transmission ratios can be setup at 82. After this tab or screen is selected, the user can input a product status and a transmission manufacturer of the installed model can be selected. The production status can be standard, out of production, or some other production status. The make and model of the transmissions can then be entered. Once a specific model has been selected, a chart can be displayed that contains information about that model, such as the number of speeds, the torque rating, and the standard ratios for each gear. In alternative embodiments, this information can be inputted into the system 10 by the user, or downloaded into the system 10 from the Internet, World Wide Web, or by other similar types of information transfer approaches. Relevant attributes on this screen can include forward speeds, reverse speeds, input torque, output torque, gear name, gear ratio, and other related data fields or attributes. The transmission model selected on this screen can be transferred to the acquisition subsystem 52 to be used for data collection purposes.

Model and manufacturing information relating to other components of the vehicle can be entered at 84. The system 20 can incorporate a wide variety of different setup attributes in generating vibration attributes through the analysis subsystem 54, as described below.

Sensor/channel setup can be performed at 86. This is the screen on which channel parameters for data collection are selected. In multi-sensor/channel embodiments, the user selects the number of sensors/channels on this screen. The locations of the various sensors, as well as the type of sensor used, can also be selected using this screen.

If only one sensor/channel is desired, the location of the single speed sensor must be determined. In some embodiments, sensor locations are limited to one of a predetermined list of options. For example, selection of a location could be limited to the pickup at the engine flywheel, the transmission input shaft, the PTO gear (a "power take off" device on an engine or wheel which drives a secondary device), or the output shaft. As each location is selected, the appropriate diagram can be illustrated on the screen, and a comment can describe the mounting location or additional information that is important for the particular installation. Other information that can be required is the number of teeth on the gear being sensed. For one-sensor/channel tests, either the engine flywheel or transmission output will be the most common and most useful sensor locations. Transmission input shaft or transmission PTO tests may require additional hardware and/or component modifications to collect data, and this may not be feasible.

In certain two-sensor/channel embodiments, there are predetermined location pairs to select from. Table A illustrates an example of such predetermined location pairs.

TABLE A

| CHANNEL 1 | CHANNEL 2 |
| --- | --- |
| engine flywheel | transmission output shaft |
| engine flywheel | transmission input shaft |
| engine flywheel | transmission PTO |
| transmission input shaft | transmission output shaft |
| transmission PTO | transmission output shaft |
| axle input (pinion shaft) | axle output (wheel end) |
| Forward shaft yoke | Rear shaft yoke |

Other two-sensor/channel embodiment systems 10 may utilize different combinations. The system 10 can also utilize embodiments of three or more sensors/channels.

B. Data Acquisition/Collection

The acqustion subsystem 52 captures sensor measurements that can later be used by the analysis subsystem 54 to generate vibration attributes relating to the vehicle. One or more setup attributes created from the setup subsystem 50 can also be used in that process. Before the acquisition subsystem 52 can be invoked by a user at 90, the sensor(s) 12, signal conditioner(s) 16, etc. must be physically set up so the system 10 can begin a test.

Figure 9:
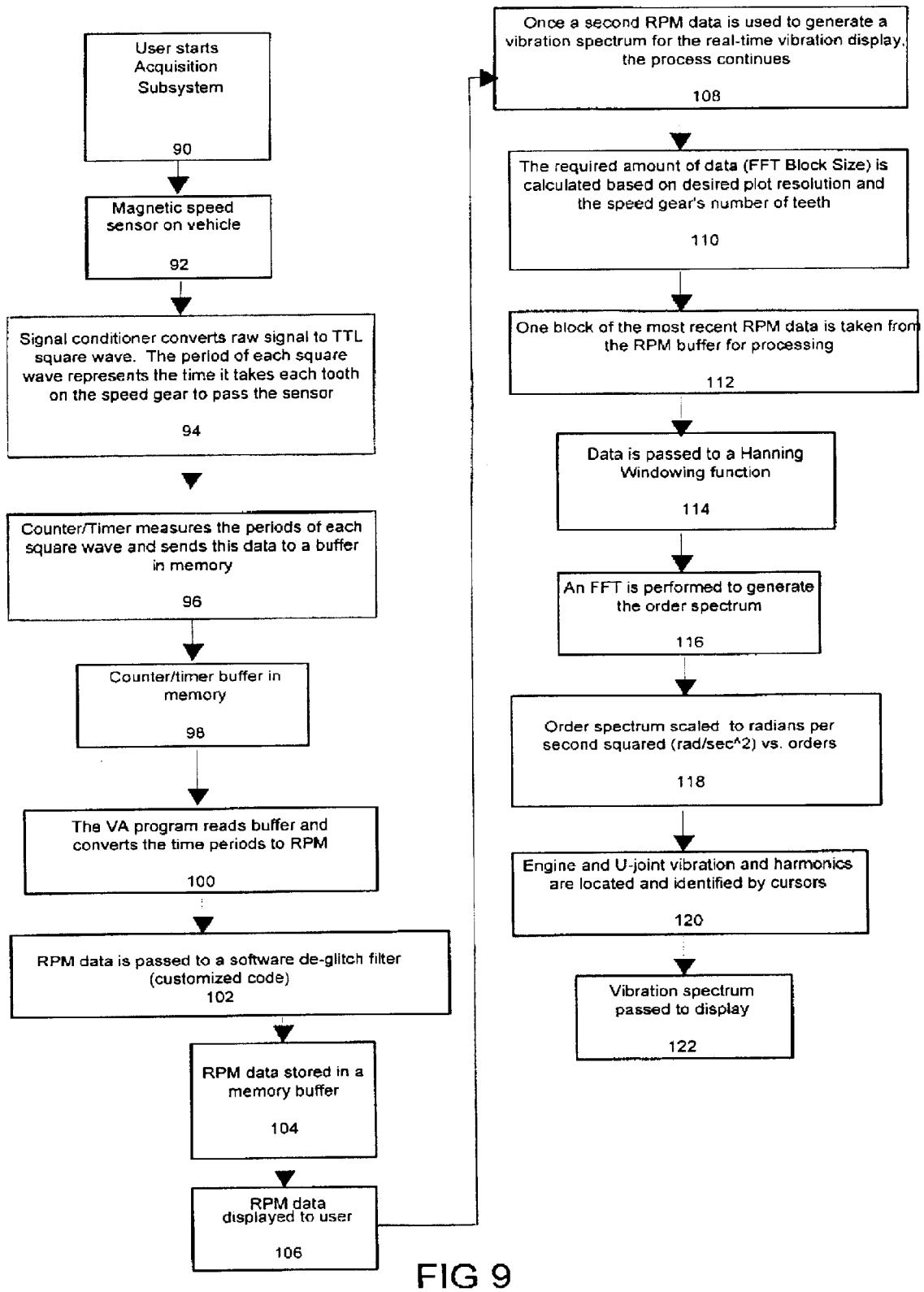
FIG. 9 is a flowchart illustrating some of the processing performed by some embodiments of the acquisition subsystem and the analysis subsystem.

FIG. 9 illustrates one example of some of the processes that can be performed by the acquisition subsystem 52 and the analysis subsystem 54 after all of the physical connections between the various system 10 components have been made.

The user can start the acquisition subsystem at 90. The sensor 12 captures raw sensor measurements at 92. As discussed above, a wide range of different types of sensor 12 can be incorporated into the system 10. If a signal conditioner 16 is to be used by the system 10, the signal conditioner can convert the raw signal of a sensor into a TTL square wave, or some other usable format for the system 10. The period of each square wave represents the time it takes for a predetermined number of teeth on the speed gear to pass the signal generating component on the sensor 12.

The counter/timer at 96 measures the periods for each square wave and sends the data to a buffer in memory, so that the information can be stored at 98. The next step of processing is performed by the analysis subsystem 54. The acquisition subsystem 52 can save data so that the analysis subsystem 54 can generate vibration attributes for the acquired data long after the test was actually conducted.

C. Analysis of Acquired Data

The mathematics behind some of the calculations performed by the analysis subsystem 54 are described in greater detail above. The system 10 is flexible, and can incorporate a wide variety of calculations and heuristics relating to the analyzing of vibrations in a vehicle. A wide variety of different sensor measurements can be incorporated with a wide variety of different setup attributes to generate a wide variety of different vibration attributes that are useful in identifying, describing, and analyzing vibrations in vehicles. FIG. 9 outlines some of the steps that can be performed by one embodiment of a multi-channel vibration analyzer. Alternative systems 10 will perform processing in a different manner, utilizing some of the various calculations and metrics discussed in greater detail above.

At 100, the analysis subsystem 54 reads the memory buffer and converts the time periods into RPMs ("rotations per minute"). At 102, the RPM data can preferably be passed to a software de-glitch filter, which is customized code for removing outliers or other misleading data not helpful to the analysis process. Some embodiments do not incorporate a de-glitch filter, and such a filter is not required for the functioning of the system 10. The RPM data can then be stored at 104 in a memory buffer. The RPM data can be displayed to a user at 106. After a second RPM data stream is used to generate a vibration spectrum for the real-time vibration display, the process continues at 108. At 110, the required amount of data (FFT Block Size) is calculated based on desired plot resolution and the speed gear's number of teeth (or alternatively some other sensor-specific characteristic). One block of the most recent RPM data is taken from the RPM buffer for processing at 112. The data can be passed at 114 so that a Hanning windowing function can be performed. A Hanning windowing function is a process known in the art for improving the results of FFT calculations. It is preferably invoked to prevent the bottom spectrum of data values from being "smeared" by the FFT calculations. In alternative embodiments, the Hanning windowing function is not required. At 116, an FFT is performed to generate the vibration attributes in the order domain. The spectrum at 118 is scaled into radians per second squared (rad/sec$^2$) vs. orders (from the order domain). This facilitates the identification of vibration attributes of particular interest and magnitude. At 120, the engine and u-joint vibration and harmonics are located and identified by the system 10. At 122, the vibration spectrum is passed to the user display 24.

Vibration attributes can take the form of torsional displacement, an order domain, a function of harmonic order, an amplitude of rotational acceleration, or any other calculated value from the sensor measurements that can be useful in evaluating and analyzing the structure of vehicle with respect to vibration. The system 10 can format such output in a wide variety of useful ways.

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the invention as defined by the following claims.

What is claimed is:

1. A tool for measuring and analyzing the torsional vibration in a vehicle driveline, comprising:

a plurality of moveable sensors, including a first sensor at a first location and a second sensor at a second location, for measuring an instantaneous speed at a driveline location and generating a plurality of speed signals, including a first speed signal from said first sensor and a second speed signal from said second sensor, and wherein a plurality of moveable sensor locations, including said first location and said second location, are defined according to a setup attribute;

a processor electrically coupled to said plurality of sensors for receiving said plurality of speed signals from said plurality of sensors and for transforming said plurality of speed signals into order domain and for processing said plurality of speed signals into rotational acceleration measurements as a function of harmonic order, said processing including calculating the amplitudes of said rotational acceleration measurements at each of one or more rotational orders; and display means for displaying said amplitudes of said rotational acceleration measurements with their respective rotational orders.

2. The tool of claim 1, wherein said first location is different than said second location.

3. The tool of claim 2, wherein said first location and said second location are selected from the group comprising an engine flywheel, a transmission output shaft, a transmission input shaft, a transmission PTO, an axle input, a pinion shaft, an axle output, a wheel end, a rear shaft yoke, and a forward shaft yoke.

4. The tool of claim 2, wherein an isolated component exists between said first location and said second location.

5. The tool of claim 1, wherein said first sensor captures said speed signals at a different rate than said second sensor.

6. The tool of claim 1, wherein said first sensor and said second sensor function in a substantially simultaneous manner.

7. The tool of claim 1, wherein said speed signals are also processed into torsional displacement.

8. The tool of claim 1, wherein said processing is performed using a fast Fourier transform.

9. The tool of claim 1, wherein said first location and said second location are selected from a group of location pairs.

10. The tool of claim 1, wherein said setup attribute is at least one of a vehicle attribute, a driveline measurement, a transmission ratio, a sensor attribute, a driveline component attribute, an environment-specific attribute, and a channel attribute.

11. The tool of claim 1, wherein said processor generates a test profile, said test profile including said setup attribute.

12. The tool of claim 1, wherein said setup attribute is inputted prior to an acquisition of a measurement by said plurality of moveable sensors.

13. The tool of claim 1, wherein said plurality of moveable sensor locations is defined prior to said plurality of moveable sensors acquiring data.

14. The tool of claim 1, wherein said processor is configured to provide information for installing said plurality of moveable sensors at said plurality of moveable sensor locations.

15. A vibration analysis system for a vehicle, comprising:
an acquisition subsystem, including:
- a plurality of sensors comprising a first sensor and a second sensor;
- a plurality of moveable sensor locations comprising a first location and a second location;
- a plurality of sensor measurements comprising a first measurement and a second measurement, wherein said first measurement is captured by said first sensor at said first location and wherein said second measurement is captured by said second sensor at said second location;
   - a setup subsystem for identifying said plurality of moveable sensor locations according to a setup attribute; and
   - an analysis subsystem for calculating a vibration attribute from said plurality of sensor measurements.

16. The system of claim 15, wherein said plurality of sensors collect said plurality of sensor measurements at different rates.

17. The system of claim 16, wherein a user interface can set the rates for said plurality of sensors.

18. The system of claim 15, wherein said vibration attribute is selected from a group comprising an order domain, a function of harmonic order, an amplitude of rotational acceleration, and a torsional displacement.

19. The system of claim 15, wherein said analysis subsystem use said setup attribute for calculating said vibration attribute, and said setup attribute is set by said setup subsystem.

20. The system of claim 19, wherein said setup attribute belongs to a group comprising a vehicle attribute, a driveline measurement, a transmission ratio, and sensor attribute.

21. The system of claim 15, wherein an isolated component exists between said first location and said second location.

22. The system of claim 15, wherein said acquisition subsystem saves said plurality of sensor measurements in a memory component and wherein said analysis subsystem accesses said memory component to calculate said vibration attribute.

23. The system of claim 15, said vibration attribute belonging to a group comprising an order domain, a rotational acceleration, a rotational order, and a torsional displacement.

24. The system of claim 15, wherein said setup attribute is at least one of a vehicle attribute, a driveline measurement, a transmission ratio, a sensor attribute, a driveline component attribute, an environment-specific attribute, and a channel attribute.

25. A method for analyzing the vibration in a vehicle, comprising:
- inputting a setup attribute;
- collecting a sensor measurement from a sensor;
- saving the sensor measurement in a processor; and
- generating a vibration attribute from the inputted setup attribute and saved sensor measurement further comprising identifying a moveable sensor location according to said setup attribute, wherein a plurality of sensor measurements, further comprising placing said plurality of sensors at a plurality of sensor locations in the vehicle.

26. The method of claim 25, wherein said setup attribute belongs to a group comprising a vehicle attribute, a driveline measurement, a transmission ratio, and sensor attribute.

27. The method of claim 25, further comprising isolating a component in the vehicle between said plurality of sensor locations.

28. The method of claim 25, further comprising placing said sensor at the identified sensor location.

* * * * *